(12) United States Patent
Bhagavath et al.

(10) Patent No.: US 6,829,781 B1
(45) Date of Patent: Dec. 7, 2004

(54) NETWORK-BASED SERVICE TO PROVIDE ON-DEMAND VIDEO SUMMARIES OF TELEVISION PROGRAMS

(75) Inventors: Vijay K Bhagavath, Lincroft, NJ (US); Robert Edward Markowitz, Glen Rock, NJ (US); Joseph Thomas O'Neil, Staten Island, NY (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/577,642

(22) Filed: May 24, 2000

(51) Int. Cl.$^7$ ................................................ H04N 7/173
(52) U.S. Cl. ..................... 725/94; 725/86; 725/87; 725/91; 725/92; 725/93; 725/105; 725/121; 725/131
(58) Field of Search .................. 725/86–104, 105, 725/121, 131

(56) References Cited

U.S. PATENT DOCUMENTS

| | | | |
|---|---|---|---|
| 5,737,552 A | * | 4/1998 | Lavallee et al. ............ 345/720 |
| 6,236,395 B1 | * | 5/2001 | Sezan et al. ................. 345/723 |
| 6,263,505 B1 | * | 7/2001 | Walker et al. .............. 725/110 |
| 6,268,849 B1 | * | 7/2001 | Boyer et al. ................... 725/40 |
| 6,298,482 B1 | * | 10/2001 | Seidman et al. ............ 725/101 |
| 6,317,885 B1 | * | 11/2001 | Fries ............................ 725/109 |
| 6,564,383 B1 | * | 5/2003 | Combs et al. ............... 725/136 |
| 6,567,980 B1 | * | 5/2003 | Jain et al. ....................... 725/61 |

\* cited by examiner

*Primary Examiner*—John Miller
*Assistant Examiner*—Michael W. Hoye

(57) ABSTRACT

A network-based device allows customers to receive television programming and to view summaries of the programming. A method of providing the summaries comprises: dividing a received program into program segments each identified by index marks, summarizing each program segment into summary segments identified by similar index marks, storing the summary segments and accessing the summary segments to supply the summary segments in lieu of program segments upon demand.

10 Claims, 14 Drawing Sheets

```
                            ┌─ 802
┌─────────────────────────────────────────────────┐
│     USER INTERFACE FOR INTERRUPTED VIEWING      │
├─────────────────────────────────────────────────┤
│                                                 │
│   Channel P is now being summarized.            │
│                                                 │
│   Options:                                      │
│                                                 │
│       1. Return to channel P                    │
│ 804 ─┤                                          │
│       2. View summary of missed content         │
│                                                 │
│                                                 │
│                                      ┌── 806    │
│       Enter option id  [        ]────┘          │
│                                                 │
└─────────────────────────────────────────────────┘
```

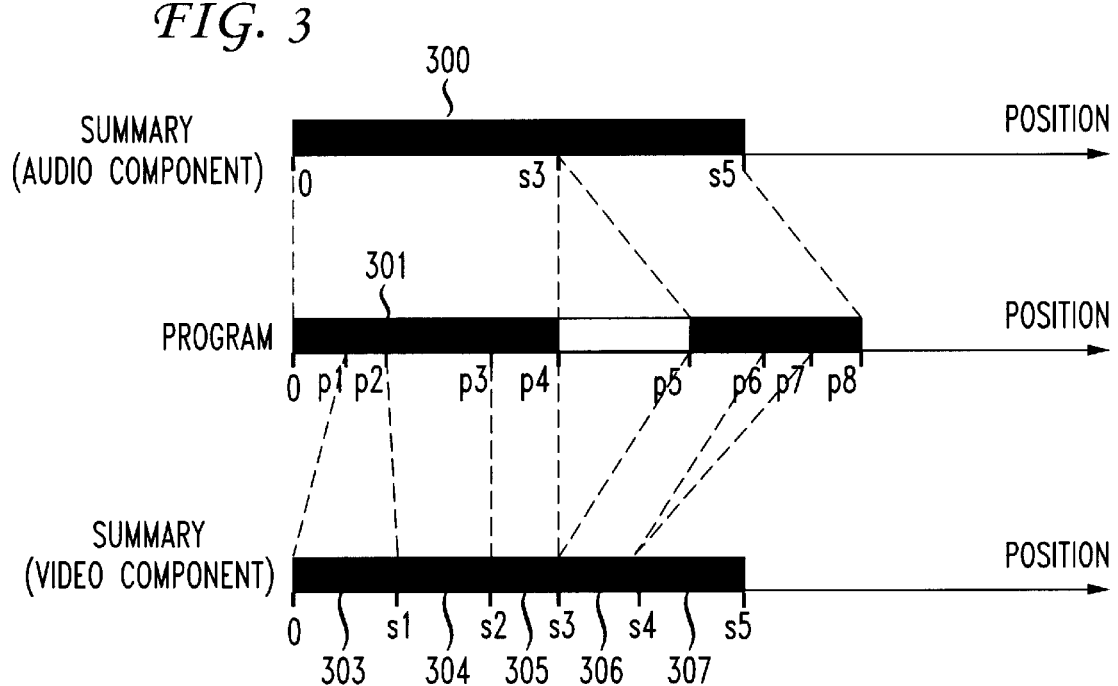
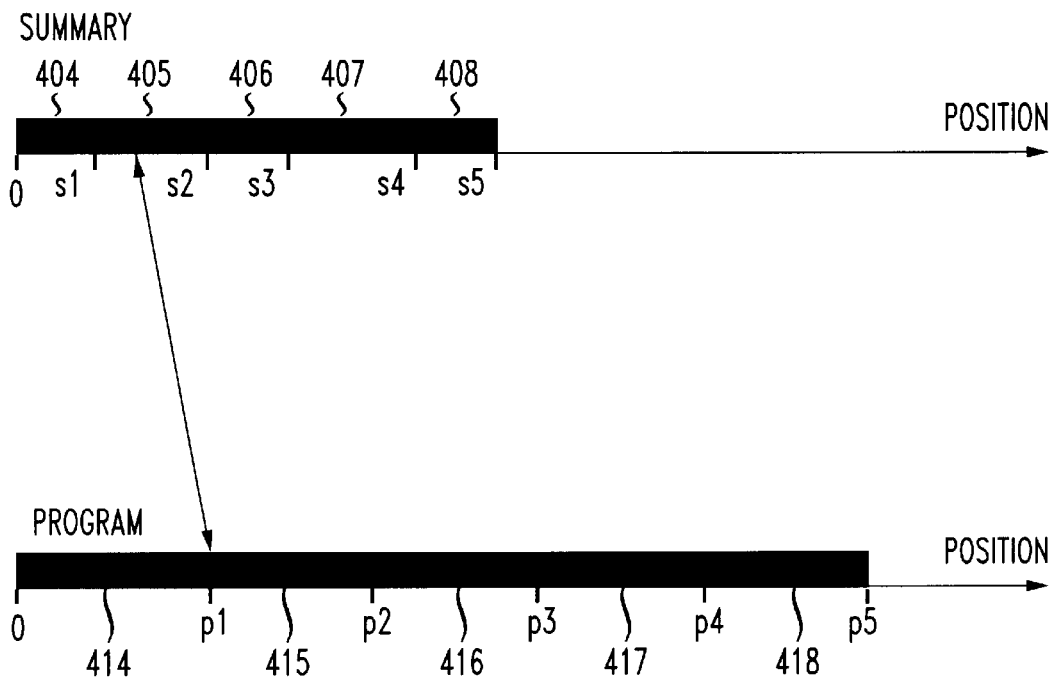

FIG. 7

USER INTERFACE FOR VIDEO SUMMARIES — 702

Summaries:
1. 60 Minutes (CBS, 8/1/99, 7PM EST)
2. Dateline (NBC, 8/4/99 10PM EST)
3. Titanic (HBO, 8/2/99 8PM EST)
4. 20/20 (ABC, 8/5/99 10PM EST) — 704
5. World News Tonight (ABC, 8/3/99, 6:30PM EST)
6. ER (NBC, 8/4/99, 10PM EST)
7. Tonight Show (NBC, 8/5/99, 11:30PM EST)
8. Today (NBC, 8/9 7AM EST)

Enter summary id [    ] — 706

FIG. 8

USER INTERFACE FOR INTERRUPTED VIEWING — 802

Channel P is now being summarized.

Options:

1. Return to channel P
2. View summary of missed content — 804

Enter option id [    ] — 806

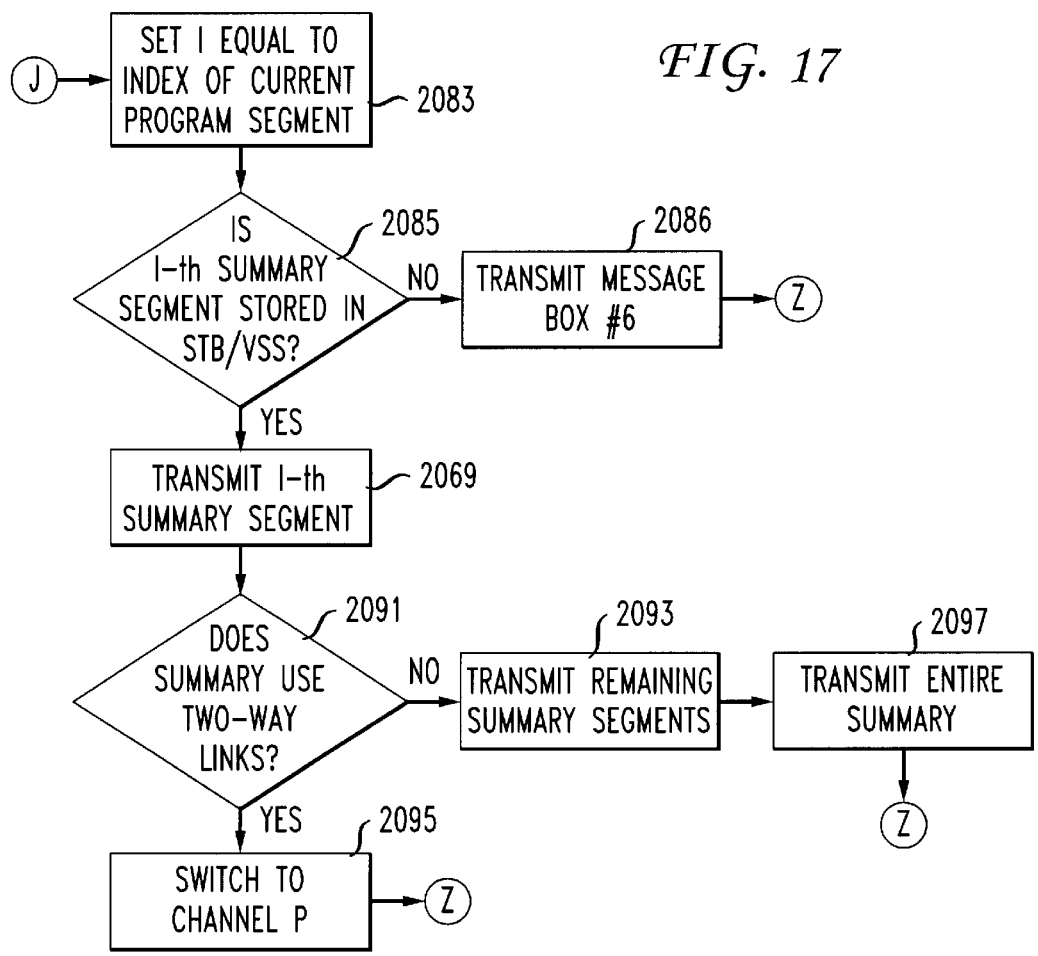
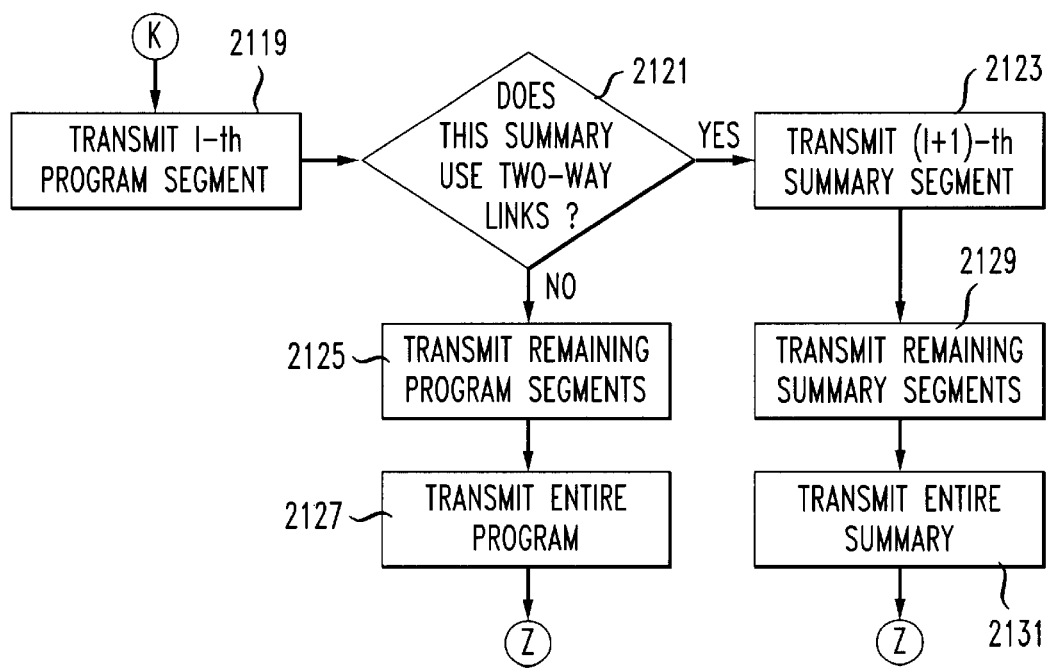
FIG. 17

NETWORK-BASED SERVICE TO PROVIDE ON-DEMAND VIDEO SUMMARIES OF TELEVISION PROGRAMS

FIELD OF THE INVENTION

This invention relates to extracting summaries of television (or audio) programming both during live broadcasting and post broadcasting. It is in one instance concerned with recipient controlled recovery of summaries of programming supplied via cable and xDSL access links. In another aspect it concerns back-and-forth intermingling of summaries and live/recorded programming under control of a recipient customer. It particularly concerns apparatus within a broadcast network and on customer premises to enable such extraction and presentation of summaries.

BACKGROUND OF THE INVENTION

Recording apparatus presently generally available permits a recipient of television and radio programming to record real-time programming (i.e., on VHS tapes) and replay it at a later time. The most ubiquitous example is the VCR, which allows recordation of live TV programming under recipient control for replay at a time of the recipient's choice. To record, the customer must select the time of the interval to be recorded.

There exist more sophisticated systems (Digital Video Recorders) which automatically record programming (via a digital cache/memory) and allow the user to selectively view portions of the recorded programming at a later time. An example of such a recording system is the ReplayTV digital video recorder and the TiVo Personal TV digital video recorder, which supply up to 30 hours of recording time. They provide features that surpass recording by monitoring listener preferences and by suggesting programming appropriate to these preferences. Recording may occur during live programming and if live viewing is interrupted the viewer may recover a delayed presentation of the programming at the end of the interruption interval.

These record/playback systems are however limited by failing to fully utilize network system capabilities. Summaries, for example, may be poorly defined or delimited resulting in loss of program material available to the user/viewer. Options available to the user are limited to manipulation of programming as received rather than using network and program provider resources to provide a broad spectrum of control.

SUMMARY OF THE INVENTION

Recipients who receive network programming are enabled, according to principles of the invention, to receive television/audio programming from a distribution network and view selected summaries of such programming as part of a network-based service. Identification and preparation of the summaries is at least in part a network-controlled process with recipient utilization of the features provided being under control of the recipient viewer. Features include recovery of audio, snapshots (stills) and full-motion video summaries extracted from program content. A summary in some instances may be a specially created overview, of a program created by a program source that is provided by a program source or provider. In some instances, segments may be created independent of the programming as a leader or overview in advance of the program or as an inducement to watch pre-stored programs.

Summaries are generally program segments extracted from complete programs and may include various combinations of audio, full-motion video, still pictures (i.e., selected frames), and other presentation modes either singly or in any desired arrangement. Accessing techniques may be by user control or system controlled selection based on user profiles. Direct user selections, may be made by a user for covering interruptions to user viewing. Network control allows greater selectively, to determine if program content is desired or to meet other user generated requests, which a summary may satisfy.

In an illustrative embodiment, the sources of programming generate and transmit summaries that include control information to permit a recipient to selectively choose and replay the summaries. In some embodiments a video summary server (VSS) is included in the network to perform summary/program storage and provide access functions. In another embodiment a set top box (STB) is included on recipient premises to receive program/summaries and perform some of the viewing control functions and store summaries.

The process of transmitting and generating summaries is based in part upon properties specified in the MPEG-2 (Moving Picture Experts Group) standards. MPEG-2 is a standard concerning signal encoding and real time transmission of video and audio program streams. The standards primary goal is bandwidth compression as well as combining and multiplexing. Packet headers under the standard include many features such as time stamps, typing of payloads and combining/multiplexing all of, which are useful in enabling the invention of applicants. MPEG-2 includes many features including information-carrying capability of a video stream. This permits the transmission of information by the program source that enables the features of the invention to be realized.

In one aspect the method of the invention processes programming to facilitate selection and delivery of summaries of the programming to recipients by providing the programming to the recipient via a program channel. Index markers are applied to the program to divide the programming into segments. Summary segments are generated containing information from corresponding programming segments and related to one another by corresponding index markers. Metadata files are created and associated with a summary channel and operate to delimit beginning and ending of segments in both programming and summary channels. Metadata includes the indexing information for facilitating links between programming segments and summary segments. A user/recipient selects a summary by activating a link between a programming segment and a summary segment by utilizing the metadata file included with the summary channel. The summary is transmitted to the recipient, via the summary channel.

In a particular embodiment the summary channels include metadata to implement/facilitate a linking back and forth between summary and program channels under command of a user. The MPEG-2 standards enable user data, in the form of metadata, to be included in a video sequence. This data delimits the beginning and end of segments in both summary and program channels. The standard further allows an elementary data stream to be included within a program stream. The elementary data stream is used to provide indexing used to implement video linking and interrupted viewing features.

In one aspect the relevant control is responsive to metadata supplied to define and identify summaries corresponding to particular programs. It defines start and end marks of both summaries and programs and the nature of the linking connections between summary and program. Such metadata is easily to integrate with the programming under the MPEG-2 standard.

The reviewing and selection functions include but are not limited to;

Supplying and viewing summaries of programs as a means of selection of programs to view in their entirety.

Providing recipient control to select related summaries and full program segments through summary-segment linkage marks.

Providing one-way and two-way video hyperlinks between programs and summaries.

Providing the viewing recipient with missing portions of interrupted program viewing.

Generating summaries during live programming for intermittent viewing.

Providing summaries permitting selective recipient recording of portions of a program.

DESCRIPTION OF THE DRAWING

FIGS. 1 through 6 are diagrammatic illustrations of modes of selections and presentations of summaries of video programming;

FIGS. 7 and 8 are schematics of a screen control menu presented to a viewer;

FIGS. 15, 16 and 17 is a flow chart disclosing a control process permitting the exercise of summary selection and viewing by a recipient of programming.

DETAILED DESCRIPTION

Figure 1:
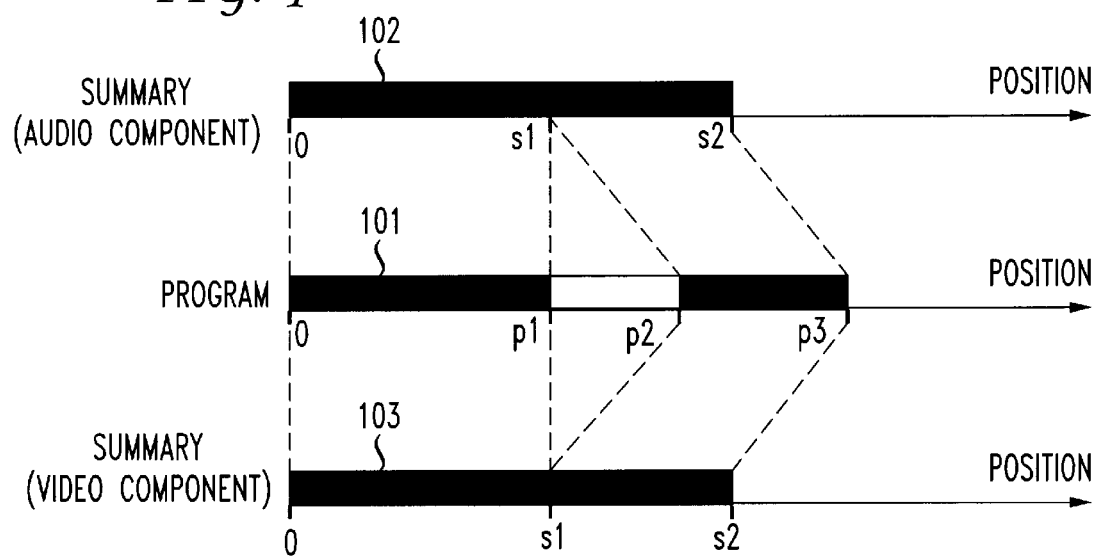

Viewing of summaries of audio and video programming is available, according to the invention in many styles and formats. Summaries may be generated dynamically by a recipient viewer's requests or recalled from a central repository of summaries at user request. Various systems of generating, using and recalling summaries are illustrated in the program schematics of FIGS. 1 through 6. In the circumstances of FIG. 1 a program sequence is shown by the bar 101 showing the evolving of the program. As the program progresses the program's progress is marked by the markers P1, P2, P3, . . . These markers are related to corresponding markers shown in the Summary (audio) bar 102 and the Summary (video) bar 103. As shown the program from 0 to P1 may be shown as summary from 0 to S1. The subsequent portion from P1 to P2 may be bypassed and a subsequent portion of the program from P2 to P3 shown as summary from S1 to S2. The summaries shown are full motion and all inclusive of materials within the marker interval covered and/or summarized.

Figure 2:
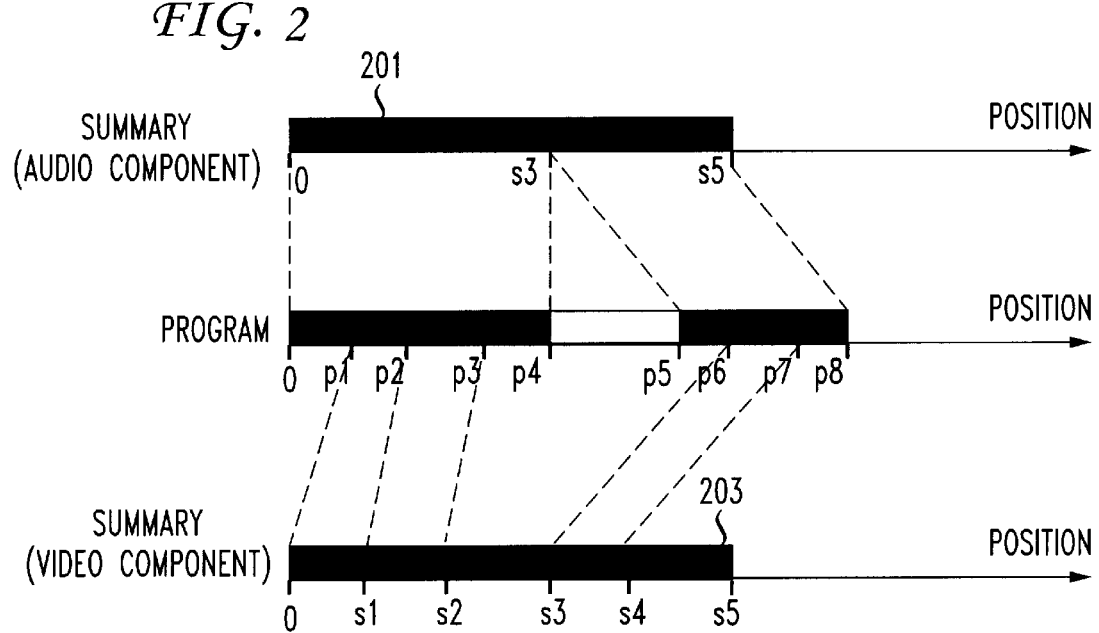

In the illustrative summaries of FIG. 2, markers P1, P2, P3, . . . segment the program. An audio summary 201 is created resulting in audio summaries 0 to S3, and s# to S5. The video portion is reduced to snapshots or still pictures 203 with each still picture related to a particular program segment. The snapshot from position P2 in the program is sued during the summary interval from S1 to S2. The use of still images and full motion images may be interspersed as desired. This option is illustrated in FIG. 3 where the video summaries 303, 304, 305, 306 and 307 comprise still images and full motion images of the basic programming 301. Full motion images are interspersed with still images. An audio summary component 300 is also shown.

FIG. 4 illustrates an example of one-way video hyperlinks. A user beings by viewing a summary and selecting the link function during the summary segment 405. Control passes to the beginning of the corresponding program segment 415. When that program segment completes, control continues with the remaining program segments. Other summary segments are shown by way of illustration in FIG. 4 as segments 404, 406, 407 and 408. Further, other program segments are also illustrated as program segments 414, 416, 417 and 418.

One-way video hyperlinks can also pass control from a program segment to the beginning of the corresponding summary segment. When that summary segment completes, control continues with the remaining summary segments.

Figure 5:
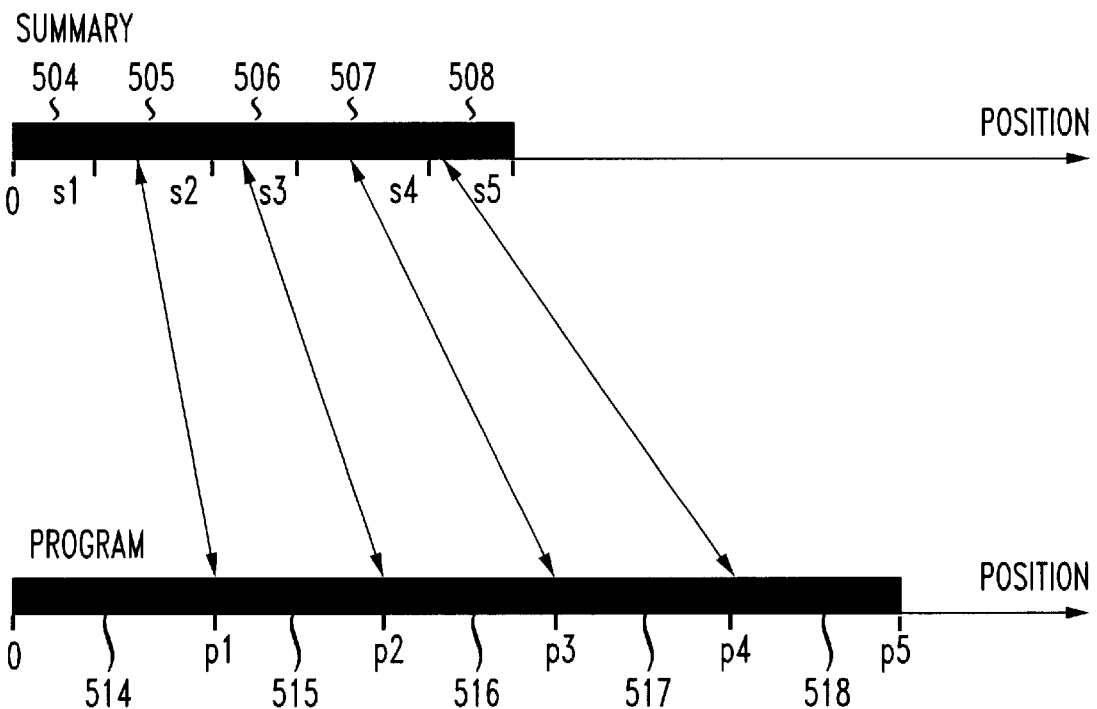

FIG. 5 illustrates the operation of two-way hyperlinks. A user begins by viewing the summary and selects the link function during the summary segment 505. Control passes to the beginning of the corresponding program segment 515. When that program segment completes, control automatically returns to the beginning of the next summary segment 506. The user again selects the link function during summary segment 507. Control passes to the beginning of the corresponding program segment 517. When the program segment completes, control automatically returns to the beginning of the next summary segment 508.

FIG. 5 further shows by way of illustration additional summary segment 504 and program segments 514, 516 and 518.

Figure 6:
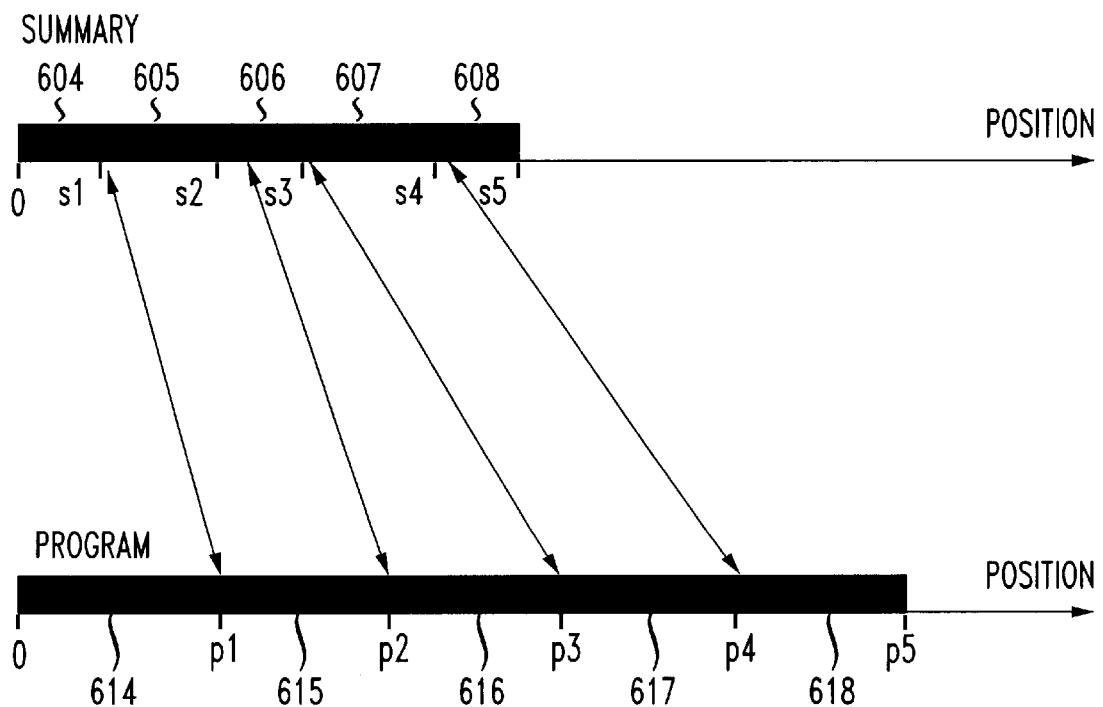

FIG. 6 also illustrates the operation of two-way hyperlinks. A user begins by viewing the program and selects the link function during the program segment 615. Control passes to the beginning of the corresponding summary segment 605. When that summary segment completes, control automatically returns to the beginning of the next program segment 616. The user again selects the link function during program segment 617. Control passes to the beginning of the corresponding summary segment 607. When that summary segment completes, control automatically returns the beginning of the next program segment 618.

FIG. 6 further illustrates segments such as summary segment 604, 606 and 608 and program segment 614.

The relationship between program and summary segments may be established and controlled through use of a metadata file or files. In the illustrative embodiment, metadata is used to identify program and summary segments. It also establishes the flags useful for two-way and one-way connecting links for use in changing from a program to a summary or vice versa. A one way link allows a user to switch from a summary segment to a corresponding program segment or switch from a program segment to a corresponding summary segment. A two-way link allows the user to view a summary segment and switch to a corresponding program segment with an automatic return to the next summary segment when the corresponding program segment completes. Two-way links also permit switching from a program segment to a corresponding summary segment with an automatic return to the next program segment.

The metadata file may also provide key words for each summary segment. Start and end positions for each summary segment may be established and correlated with start and stop positions for each program segment. Summary metadata may be expressed in XML (eXtensible Markup Language) or a suitable equivalent. XML is well known and need not be discussed in detail. An illustrative XML summary file may assume the following form, to select specific subject matter from, a program.

```
<summary>
    <summary_id>726746425</summary_id>
    <program_id>399868815</program_id>
    <links>two-way</links>
    <summary_segment>
        <index>0<index>
        <keywords>Federal Reserve, Interest Rates</keywords>
        <start>0</start>
        <end>1000</end>
    <summary_segment>
    ............
    <program_segment>
        <index>0<index>
        <start>0</start>
        <end>10000<end>
    <program_segment>
    ................
</summary>
etc.
```

The foregoing illustrative metadata file indicates that there is a summary of parts of a program relating to the federal reserve and interest rates. The metadata file is generated by the content provider. It permits the system to select the desired summary information if available. Transmission of the signal in accord with the MPEG-2 standard allows the interaction with the programming file by means of this metadata file.

The sections of this metadata file are now described. First the <summary> tag indicates the start of the file. Second the <summary id> tag provides a globally unique id for this summary. Third, the <program id> tag provides a globally unique id for the corresponding program. Fourth, the <links> tag indicates that the links between the program and summary segments operate as two-way links. Fifth, the <summary segment> tag indicates the start of a summary segment definition. One metadata file can define multiple summary segments. Sixth, the <program segment> tag indicates the start of a program segment definition. One metadata file can define multiple program segments.

Each <summary segment> contains four tags. The <index> tag assigns a unique index to that segment. The segments in a summary are assigned indexes that begin at zero and increase sequentially. The <keywords> tag associates several keywords with this summary segment. Software can use these keywords to identify segments that are most likely to be of interest to a particular viewer. The <start> tag indicates the position in the summary that marks the beginning of this segment. Position can be specified as a frame number. The <end> tag indicates the position in the summary that marks the end of this segment.

Each <program segment> contains three tags. The <index> tag assigns a unique index to that segment. The segments in a program are assigned indexes that begin at zero and increase sequentially. The <start> tag indicates the position in the program that marks the beginning of this segment. Position can be specified as a frame number. The <end> tag indicates the position in the program that marks the end of this segment.

Each summary is sequence of summary segments. The segments are contiguous and non-overlapping. Similarly, each program is a sequence of program segments. The segments are contiguous and non-overlapping.

A viewer exercises control, in one embodiment, by interaction with a set top box (STB) or with a video summary server (VSS) by means of an interactive menu such as illustrated in the screen display 702 of FIG. 7. Here the list of summaries 704 in one example of the invention may be supplied over a channel used exclusively (i.e., an S channel) for this purpose. In the illustrative menu the view may select summaries related to the listed programs by entering the number associated with that summary in the summary id box 706 by a remote or other means. The menu 804 shown in the screen display 802 of FIG. 8 provides for summaries to recover material lost due to interrupted viewing of a program. Interrupted viewing occurs when a viewer is interrupted in his viewing (i.e. called away from the television receiver). If a viewer wishes to subsequently view a summary of missed programming content or view the current program, a selection may be entered by entering the appropriate control number in the option id box by a remote or other means. This process may be facilitated by use of a dedicated I channel.

The implementation is accomplished, in part, with an application of enhancements to various elements in the program delivery system. In the illustrative embodiments such enhancements are made to the set top box (STB) in a cable reception system or to a video summary server (VSS) in xDSL program delivery systems. These enhancements provide interface capabilities and information availability for program selection and the process of delivering summaries.

Figure 9:
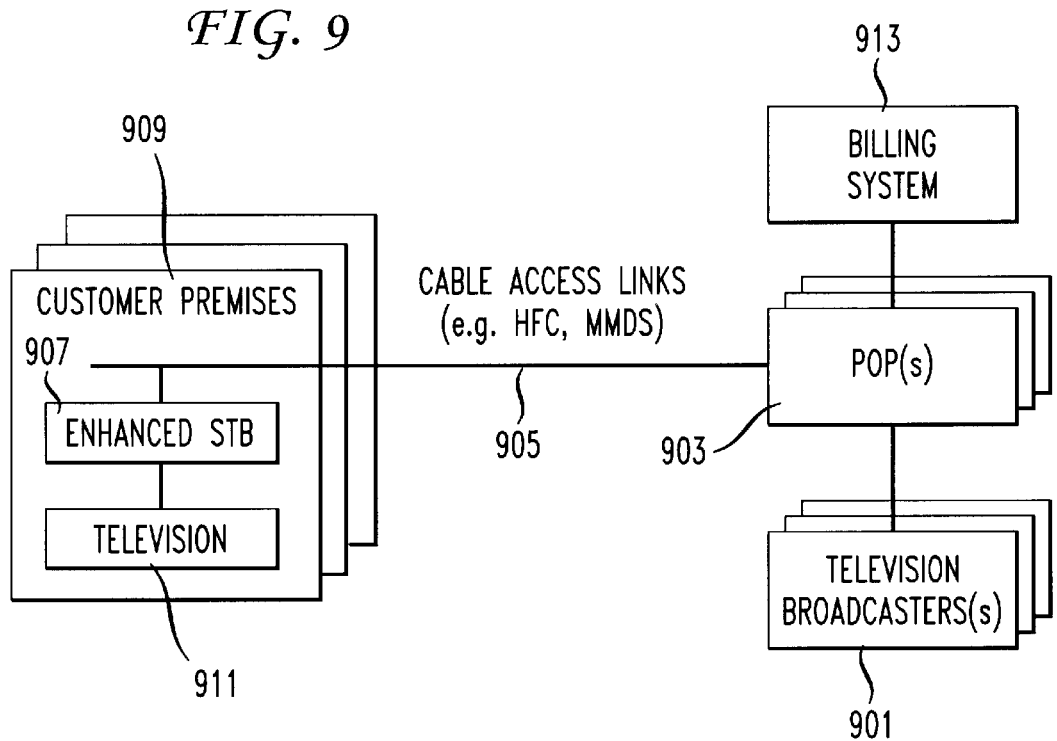
FIGS. 9 and 10 are schematics of video summary system components involving cable networks.

An illustrative system architecture for constructing and viewing program summaries is shown in the FIG. 9. This system is adapted for Cable networks and as shown includes a television-broadcasting source 901 connected to a network POP (Point-of-Presence) 903. POP herein is the physical equipment of a provider network at which the network terminates and which is connected to a recipient subscriber. A cable access link 905 connects POP 903 to an enhanced STB 907 located at customer premises 909. STB 907 provides the television signals to the television receiver 911. A server 913 maintains billing records.

Figure 10:
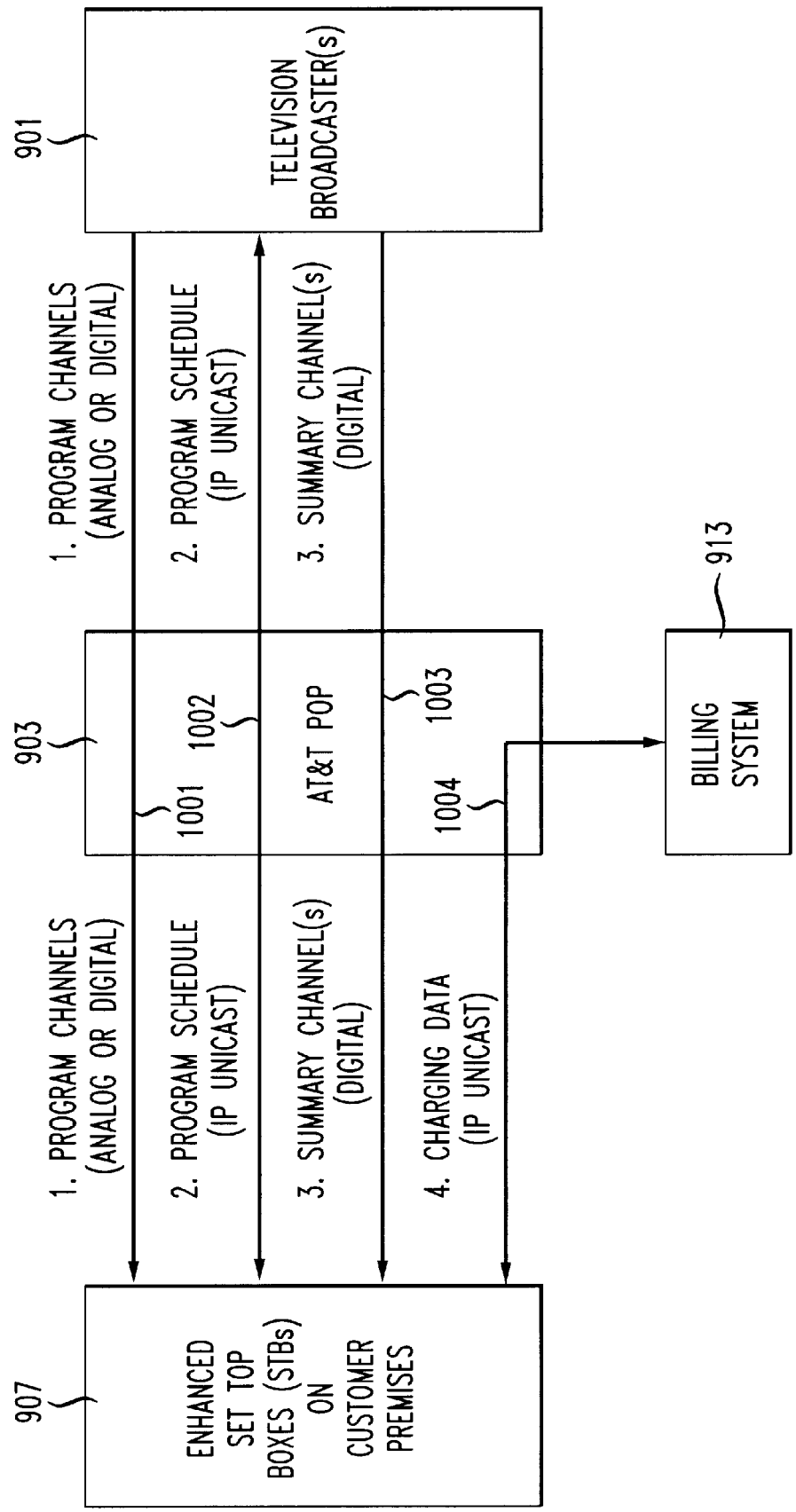

A series of signals, for summary viewing, is diagrammed in the schematic of FIG. 10, showing the primary signal interfaces between the television-broadcasting source and the customer. The television-broadcasting source 901 provides program channels 1001 via the POP 903 to the STB 907 at the customer premises. The television channels are transmitted by various program providers to the POPs 903 and transmitted from the POPs to the STBs 907 at the customer's premises 909.

Each program and summary is assigned a globally unique identifier. This information is transmitted to the VSSs and STBs by the program summary channel.

Each broadcaster maintains a schedule of programming, which is accessible to the STBs via IP unicasting 1002 through the POPs 903. The customer may access programming-related descriptive material via the same IP channel. Separate digital summary channels 1003 are used to transmit program summaries from the broadcasters to the STB. The STB can receive and store these summaries from the broadcaster.

Charging data for the service provided is maintained by a billing system server 913 connected via channel link 1004 through the POP 903 to the STB 907. Billing in the illustrative example may be by subscription, by transaction or other suitable arrangement.

Figure 11:
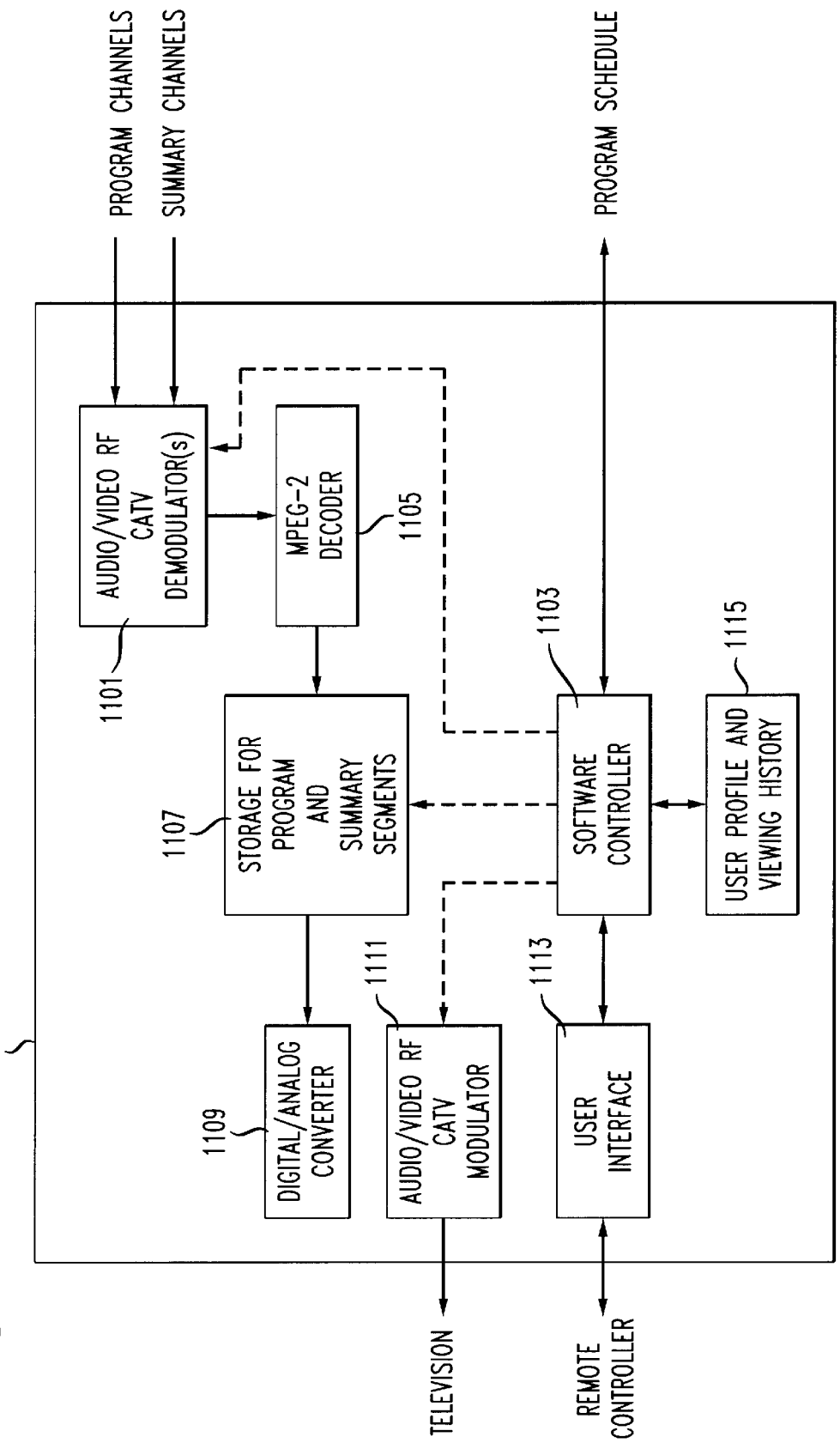
FIG. 11 is a schematic functionally illustrating a set top box (STB) with enhancements for enabling summary storage and retrieval.

An illustrative enhanced set top box (STB) 907, for cable reception, is schematically shown in block form in the FIG. 11. Program and summary channels from the broadcaster are applied to a bank of Audio/Video RF CATV Demodulators 1101. The demodulators each recover a specific program or summary channel as directed by control of the software controller 1103. Software controller 1103 includes stored programming that controls and coordinates operations of the various STB functions.

The recovered programming/summaries (streams) are applied to an MPEG-2 Decoder. MPEG-2 is a standard concerned with video and audio coding and processing other multimedia signals (e.g., packet streams). Decoder 1105 is designed in accord with this standard. MPEG processing, decoding of digital signals and design of a MPEG-2 system decoder is discussed in "Digital Video: An Introduction to MPEG-2 " by B. G. Haskell et al 1997. This discussion of this book is incorporated herein by reference. This MPEG output stream is applied to a storage element 1107 for storing program and summary segments. Program storage may be by memory circuits, disk recordings or any suitable means compatible with the content stored.

Various stored material is selected under control of the software controller 1103 and transmitted to the digital to analog converter 1109 to place the program or summary in a suitable form for the home television receiver. The analog signal is coupled to the home television receiver, via the Audio/Video RF CATV Modulator 1111, which converts the signals to NTSC (National Television Standards Committee) standards for application to the home television receiver.

The user/recipient exercises control of program summary selection by input to a user interface 1113 which commands are coupled to the software controller 1103. Commands of the software controller 1103 are coupled to control the Modulator 1111, the storage element 1107 and the Demodulator 1101. A user Profile and Viewing history 1115 input is also connected the Software controller 1103. Its input allows automatic selection of programming material to suit viewer desires and preferences. It may base these selections of stored demographic and prior selected subject matter. The software controller uses this information to self decide which summaries to store in order to effectively utilize the storage capacity of the storage medium 1107. The user may transmit commands via the user interface 1113 to view or delete stored programs and summaries in the storage medium 1107. Control by the user may be exercised by using dialog boxes that are displayed on the screen of the receiver. Examples of dialog displays are shown in the FIGS. 7 and 8. Various types of dialog boxes are discussed below in the description of the controlling flow process of the software controller. The user may communicate with the interface by a remote controller.

Figure 12:
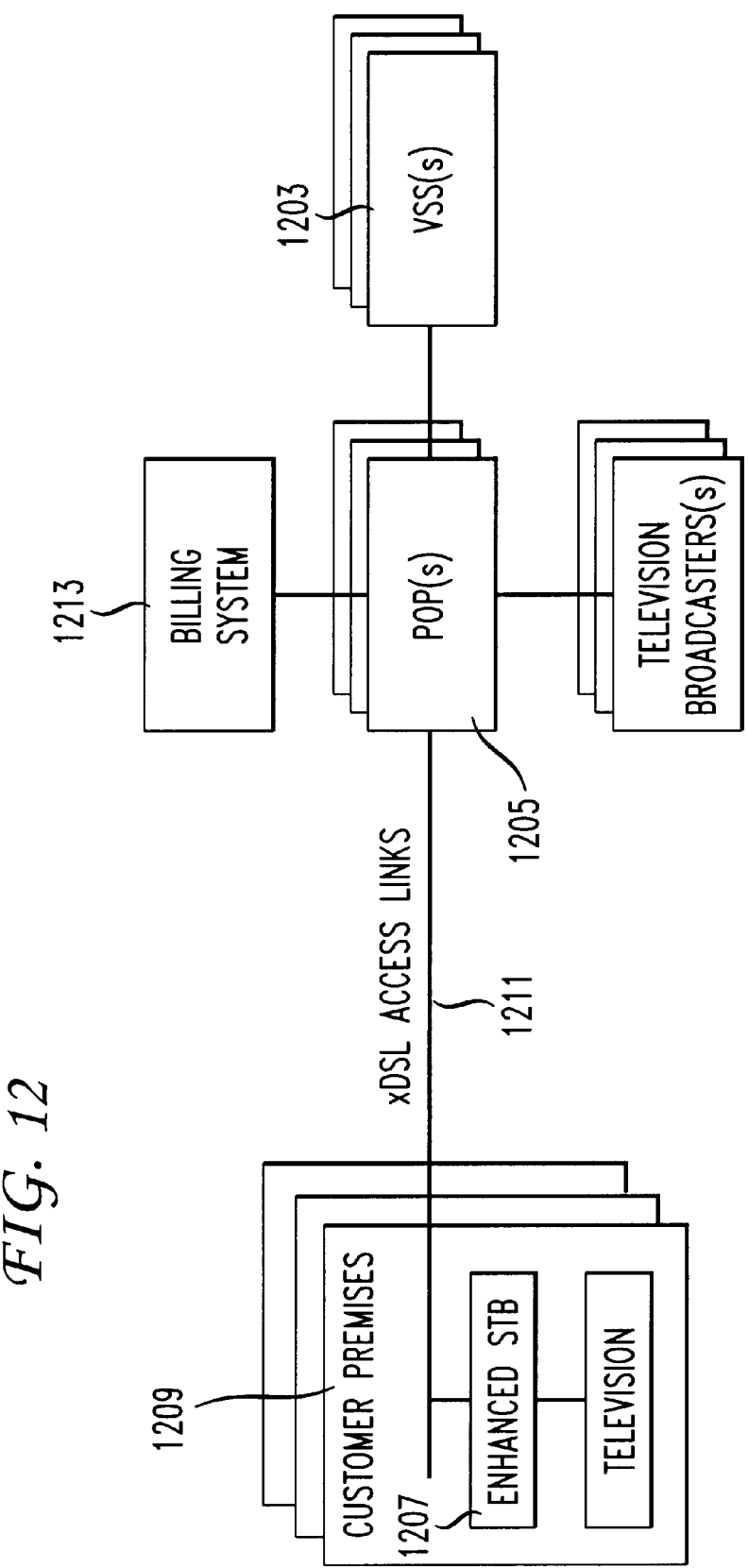
FIG. 12 is a schematic of video summary system components added to a network having a xDSL access network.

In systems utilizing xDSL, for video delivery (FIG. 12), the STB is replaced by a Video Summary Server (VSS) 1203 included in the DSL network. The programming is supplied to the user from the VSS 1203, via a POP 1205 to a modem 1207, via a xDSL Access Link 1211, to the customer premises 1209. The VSS 1203 has capabilities and processes similar to that of the STB and can autonomously decide which summaries to receive and store based on a user profile and past usage history stored in the VSS. A billing system 1213 is connected to the VSS via the POP 1205. The VSS may be integrated within the POP if desired or be embodied as a separate unit within the network.

Figure 14:
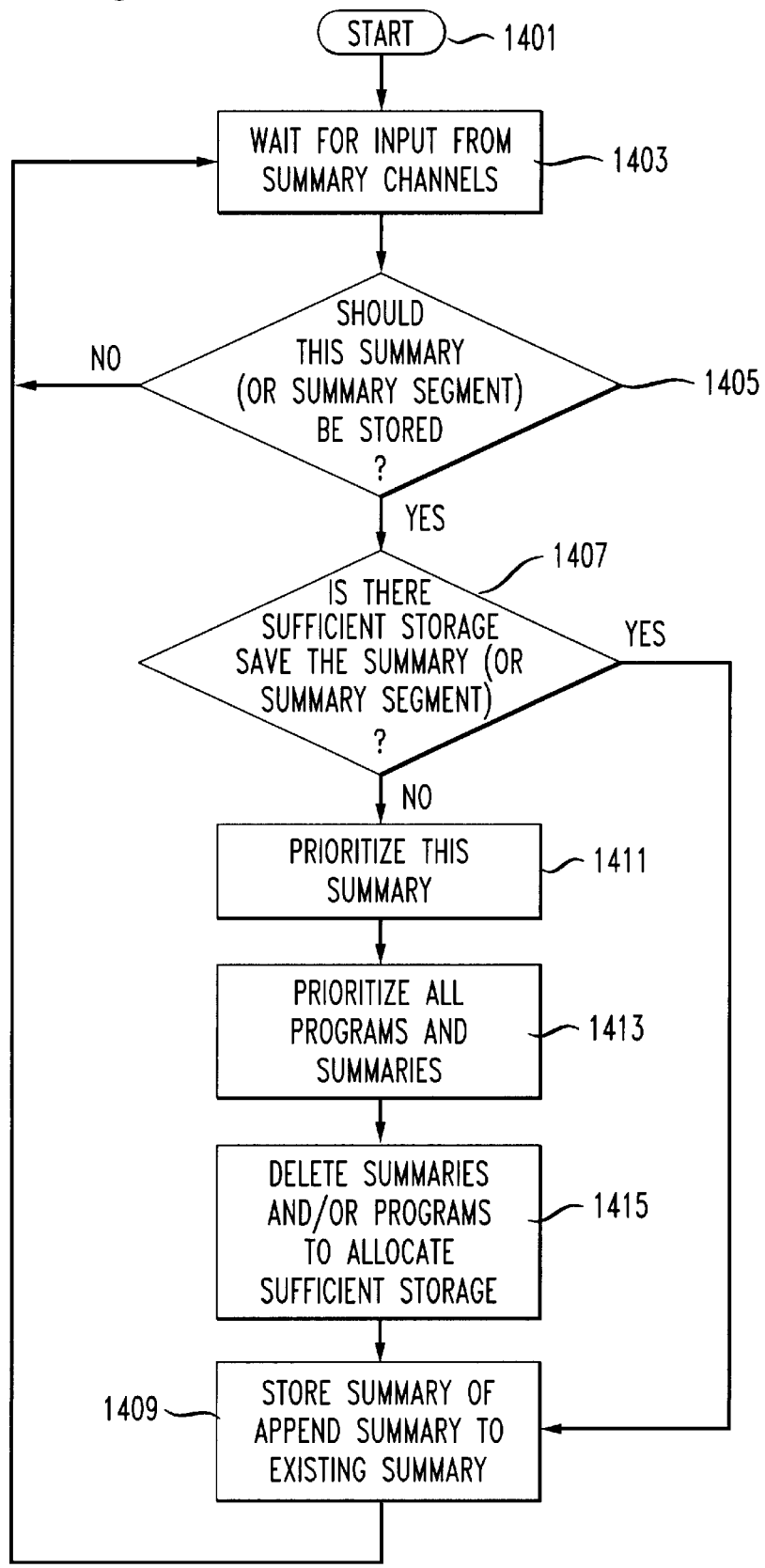
FIG. 14 is a flow chart describing a monitoring/control of video storage processes.

An important aspect of the process is monitoring the capability of the network storage elements to store the needed summaries. The process of FIG. 14 is intended to provide this capability. Starting at terminal block 1401 the controller and the storage medium it controls wait for input from the summary channels. The controller inquires, per decision block 1405 as to whether this summary should be stored based on user selection, user preferences, etc. If the summary is not to be stored the flow process returns to block 1403 and waits for further input from the summary channel.

If the summary is to be stored, the process inquires, as per decision block 1407, if there is sufficient storage to store the summary. With sufficient storage the summary is stored and/or appended to an existing summary, as per block 1409, with process flow returning to block 1403.

If sufficient storage is not available, the summary is prioritized as per block 1411 as to whether it is desirable to the user and as per block 1413 is prioritized in relation to all other programs and summaries being processed. If the immediate summary is highly rated, preexisting summaries are deleted, as per block 1415, to provide memory space for the new summary. The flow process proceeds to block 1409 instructing storage of the new summary.

Figure 15:
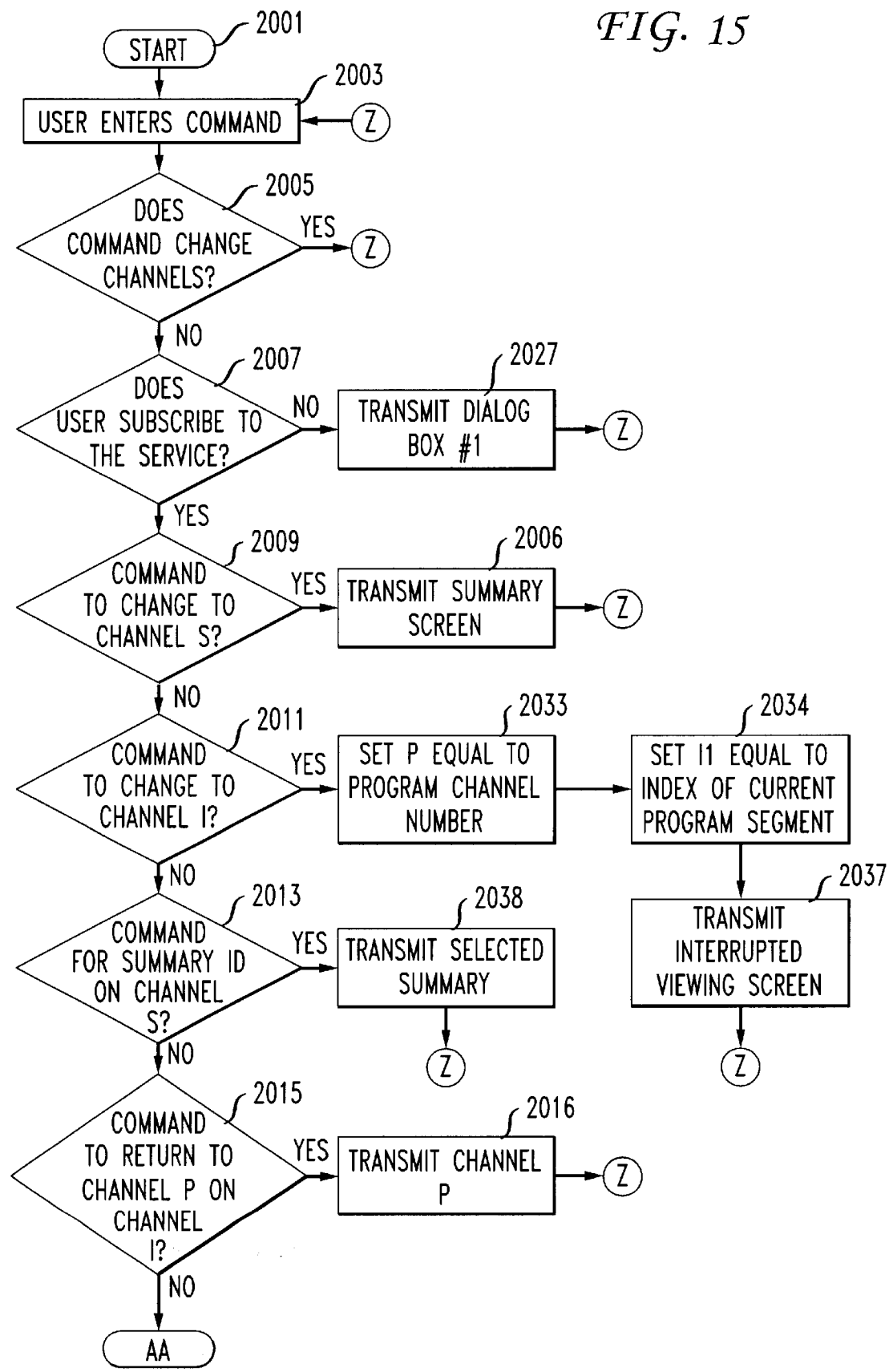
Figure 15:
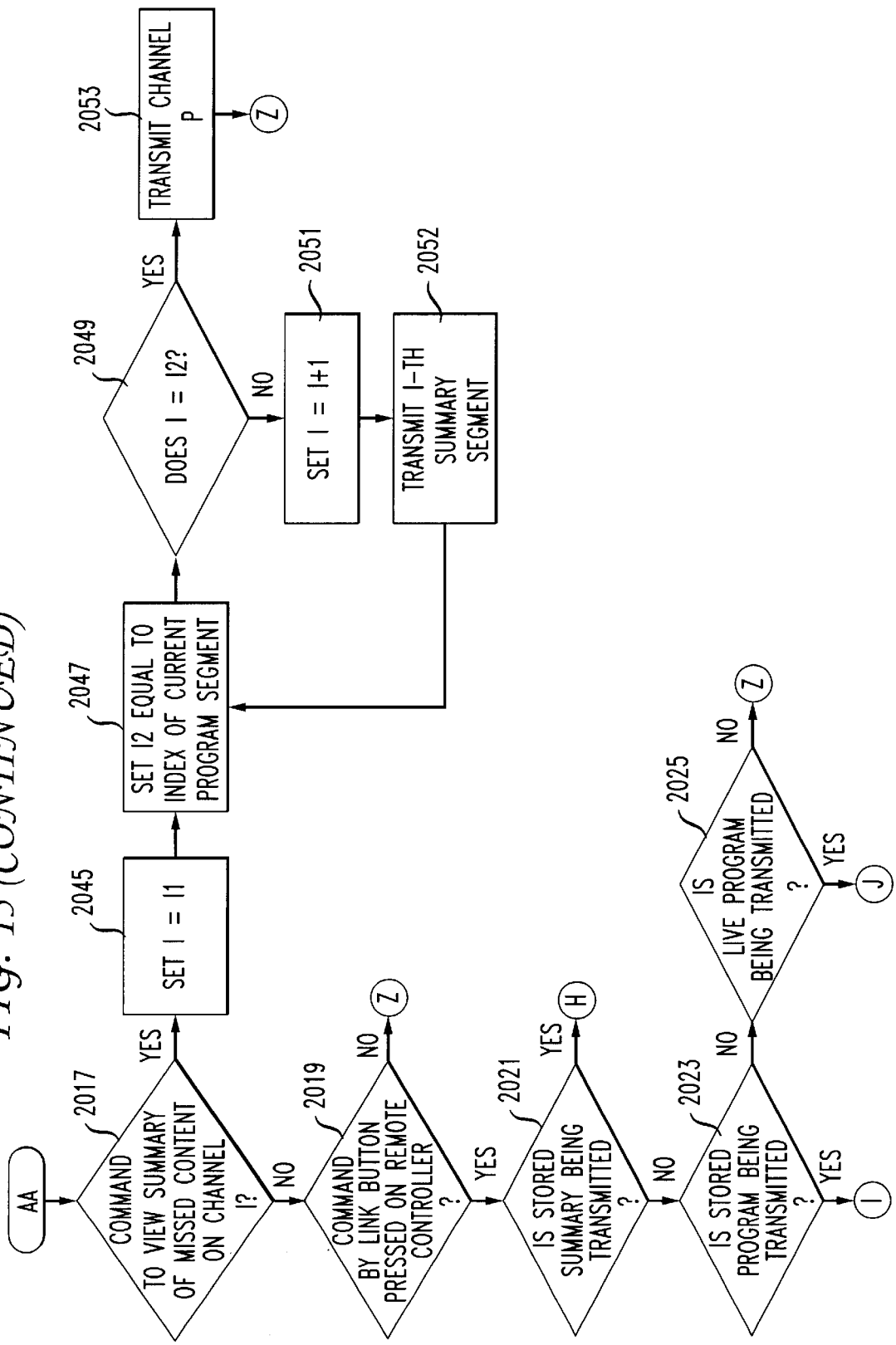
Figure 16:
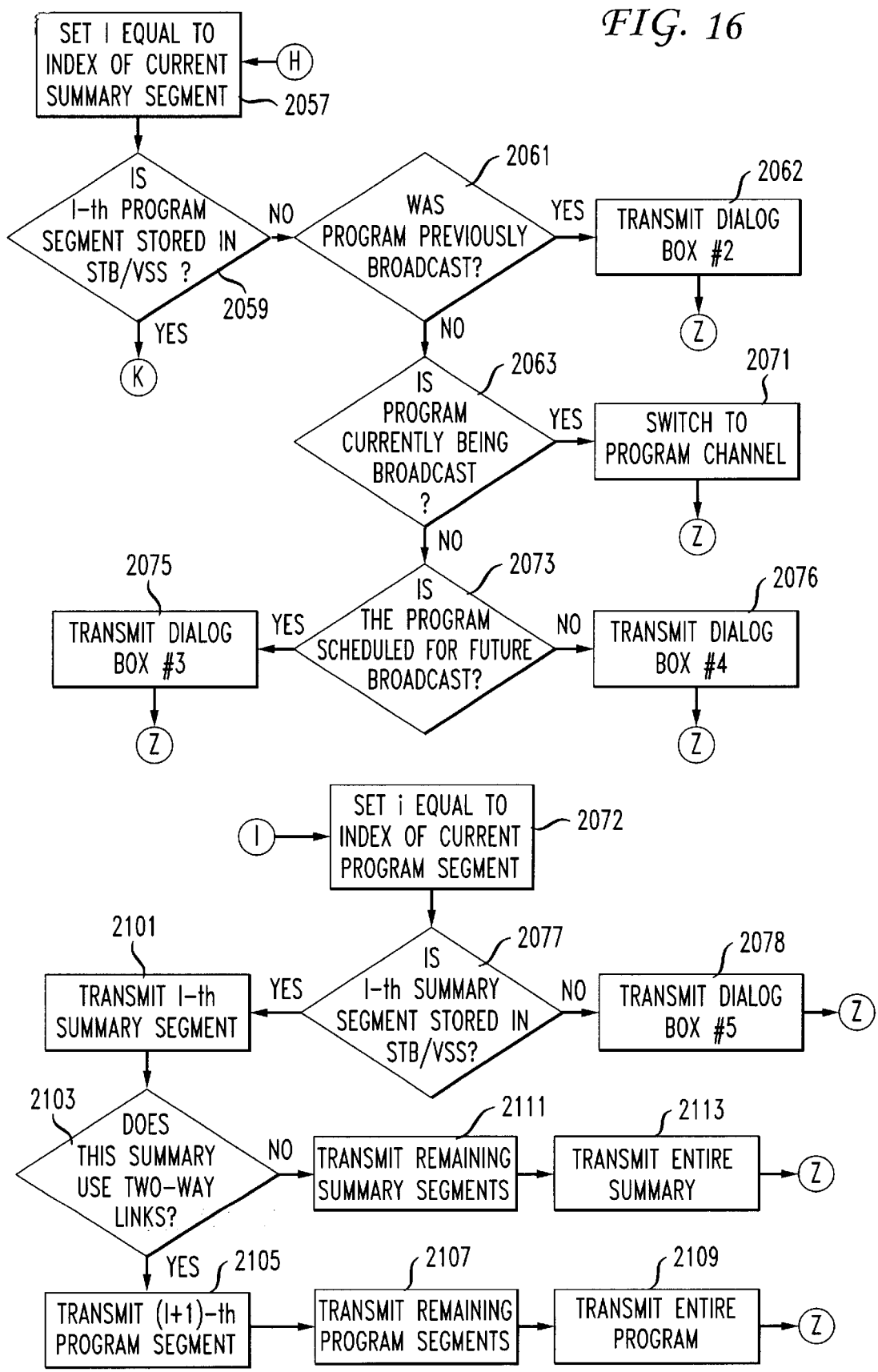

One particular procedure of permitting interaction of a user with the system is presented as an illustrative embodiment, although many other processes may be used to enact the invention. A general understanding of this illustrative embodiment of user control may be obtained from the process disclosed in a flow chart disclosed in FIGS. 15, 16 and 17. The process begins at the start terminal 2001 followed by user entry of a command as per block 2003. The software controller categorizes the command, as per block 2005, as a decision to change a channel or not change a channel. If the command is to change a channel to another program channel the flow of the process returns to the start of the process since this is a routine change of channel. If the command does not change the channel the process proceeds to a decision as specified by block 2007, which inquires if the subscriber subscribes to the service, requested. If the user is not a subscriber to the service the flow process presents the user with a dialog box #1 such as indicted by instruction box 2027 which presents a menu permitting the subscriber to enter a subscription to the service. The flow returns to the start of the flow process.

If the user is a subscriber, the process proceeds to a decision shown in the decision block 2009 to determine if the user wishes to change to a summary channel S. If the user wishes to change to a summary channel, the user is presented with a screen menu, as per box 2008, similar to the box illustrated in the FIG. 7 presenting a listing of choices of readily available summaries for viewing. Subsequently the flow process returns to the start terminal.

If the user does not wish to be presented with a menu of existing summaries the process proceeds to decision block 2011 which inquires if the user wishes to change to an interrupt channel I to create a summary while the user is absent from the television receiver. If such a summary is desired the process proceeds to set P equal to a program channel number as per block 2033 and indicator II, as per box 2034, is set to equal the index number associated with a current segment of the program being viewed. The interrupt-viewing screen (FIG. 8) is displayed as per block 2037 and the process returns to the start.

If no change to channel I is desired the next decision, as per block 2013, determines if a particular channel Id is requested on the summary channel S. If a particular summary id is requested the summary is presented, as per instruction block 2038 and the process returns to the start. If no particular summary is requested, a decision, as per block 2015, determines if there is a command to return to the channel P on the channel carrying the interrupted summary. If such a command has been issued the process returns the viewer to the program channel P, as per box 2016. The process returns to start to await a new command.

If no return to the channel P is requested the viewer has a choice to view a summary of the missed content due to interruption as per the decision of block 2017. If the missed content is to be viewed the index is set to I1 as per block 2045 and I2 is set to the current program segment, as per block 2047. An inquiry is performed, as per decision block 2049, as to whether the value I=I2 and if it is the process proceeds to instructions of block 2053 causing the program channel P to be transmitted to the viewer's television receiver and the flow returns to start. If I does not equal I2 the instructions of block 2051 set I=I+1 and the instructions of block 2052 transmit the I-th summary segment to the viewer's television receiver.

If the decision of block 2017 is not to view a summary of missed content a subsequent decision in block 2019 inquires if a link command has been issued (i.e., a link button, for example, has been actuated by the viewer). If not, flow returns to the start. If the link command has been actuated, an inquiry by block 2021 inquires if the stored summary is being transmitted. If stored summary is not being transmitted, flow proceeds to a subsequent inquiry of block 2023 to determine if a stored program is being transmitted. Again if a stored program is not being transmitted, an inquiry by block 2025 inquires if a live program is being transmitted and if not flow returns to start.

If the decision of block 2021 determines that a stored summary is being transmitted, a subsequent instruction of block 2057 sets I equal to the index of the current summary segment. An inquiry is initiated to determine if the I-th program segment is stored in the STB for cable reception or in the VSS for xDSL reception. If the segment is stored, as determined by block 2059 the flow process proceeds to instruction block 2119. If the segment is not stored, an inquiry of block 2061 inquires if the program has been previously broadcast. If the program has been previously broadcast. a dialog box #2 is transmitted to the viewer, as per box 2062, which indicates to the viewer that the program has been previously broadcast but has not been recorded. If the program was not previously broadcast, an inquiry of block 2063 inquires if it is presently being broadcast. If it is being broadcast, the instructions of block 2071 switch the viewer to that program channel and the flow returns to start. If it is not being broadcast, a query of block 2073 asks if the program is schedule for future broadcast. If it is so scheduled, a dialog box #3 is presented to the viewer, as per block 2075, so indicating that the program is scheduled for future broadcast and makes an interactive offer to record it. If the program is not schedule for future broadcast, another dialog box #4 is presented to the viewer, as per box 2076, indicating that the program is not recorded and is not schedule for future broadcast. In both previous instances, the flow returns to start. The program schedule 1002 in FIG. 10 is used to obtain the information about the schedule of a particular program. This information includes the unique ids that identify the program and its summaries.

If the decision of block 2023 determines that the stored program is being transmitted, I is set equal to the index of the current program segment, as per box 2072, and subsequent decision block 2077 presents the inquiry as to whether the I-th segment summary is stored in the STB or VSS. If it is not stored dialog box # 5 is transmitted to the viewer, as per box 2078, to indicate that a summary is not stored for this program.

If the I-th summary segment is stored in the STB or VSS the I-th summary segment is sent to the viewer as instructed by block 2101. Decision block 2103 inquires if this summary uses two way links. If two-way links are not used the remaining summary segments are transmitted as per block 2111. As per subsequent instructions of block 2113 the entire summary is transmitted. The process subsequently returns to the start.

If the two-way links are being used the (I+1)-th program segment is transmitted to the user as per block 2105 followed by transmission of the remaining program segment as per block 2107. Following this the entire program is transmitted, as per block 2019, and the process returns to start.

A determination by decision block 2025 that a live program is being transmitted directs the flow process to block 2083 having the instruction to set I equal to the index of the current program segment. An inquiry of block 2085 inquires if the I-th summary is stored in the STB/VSS. If it is not stored the system transmits the dialog message #6, as per block 2086, which indicates to the viewer that a summary is not stored for this program. If a summary is stored the I-th summary segment is transmitted to the viewer as indicated in the block 2089. An inquiry of block 2091 determines if the summary uses two-way links. If two-way links are in use the user is switched to the program channel as per block 2095 and the process returns to start.

If two-way links are not in use the remaining summary segments are transmitted to the user as per block 2093. The entire summary is transmitted as per block 2097 and the process returns to start.

If the decision block 2059 determines that an I-th program segment is stored in the STB/VSS the flow proceeds to block 2119, as indicated above, whose instructions transmit the I-th program segment. The inquiry of subsequent decision block 2121 queries if the summary uses two-way links. If not the remaining program segments are transmitted to the viewer as per block 2125 and the entire program is transmitted as per block 2127. If two-way links are in use the I-th summary segment is transmitted as per block 2123 and the remaining summary segments are also transmitted as per block 2129 resulting in transmission of the entire summary as per block 2131. The process returns to start.

In the foregoing process the user is presented various dialog boxes on the television screen with which the user may interact or be provided with process-relevant information. These dialog boxes are listed to assist in understanding the above user process. Dialog Box #1 informs the user that he/she has no subscription to the service. It provides interactive capability allowing the user to subscribe if desired. Dialog Box #2 informs the user that the program desired has been previously broadcast but has not been recorded. Programs scheduled for future broadcast are announced by Dialog Box #3 as well as providing an interactive capability to give the user the capability to record it. Dialog Box #4 informs the user that a program previously broadcast and not recorded is not scheduled for future broadcast. The Dialog Box #5 announces absence of summaries stored for the present program. This list of Dialog Boxes is intended to be exemplary and is not intended to limit the scope of the process features of the invention.

The proceeding process illustrates one illustrative method of user interaction with the system. Many departures from this scheme may be devised without departing from the spirit and scope of the invention.

Figure 13:
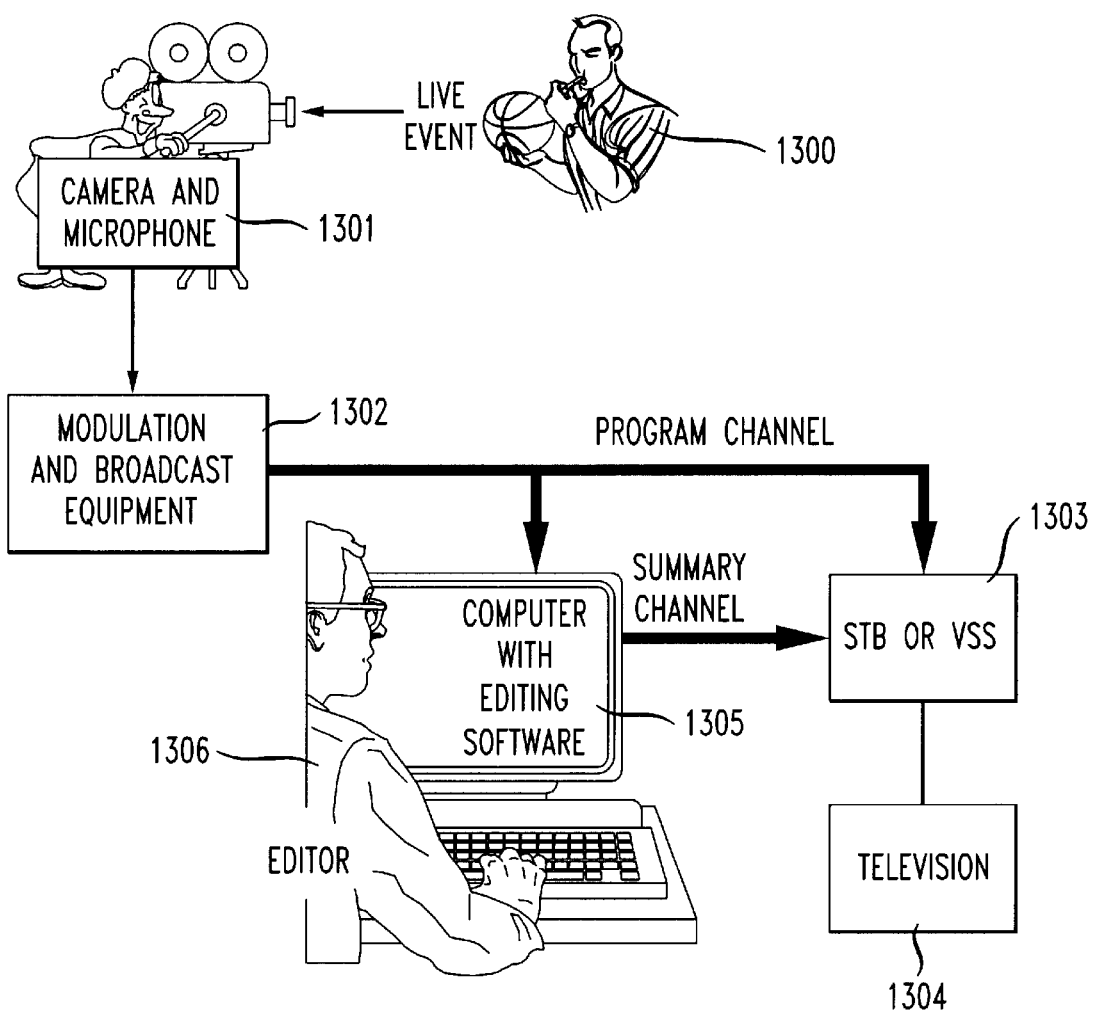
FIG. 13 is a process diagram describing summarization of live television programming.

A unique feature of the process is the allowance of summary generation during actual live event programming. The summarization process is schematically illustrated in FIG. 13 and involves the active monitoring of the program by an editor 1306. The editor 1306 may be a live person or an apparatus programmed to perform the editing process. As shown, the Live program 1300 is recorded by camera and microphone 1301 and cast into a form (i.e., digital television signal) suitable for transmission by modulation and broadcast equipment 1302. The program is transmitted by a program channel, via a POP, to an STB or VSS 1303 for application to a television receiver 1304.

The broadcast program (i.e., digital television signal) is also coupled to a computer (i.e., PC, workstation, etc.) 1305. The signal is buffered and displayed to allow an editor (i.e., live person), with appropriate editing software, to choose segments (i.e., program fragments) appropriate for creating a summary. These summaries, as well as associated metadata, are transmitted to the STB or VSS. the metadata in accord with MPEG-2 standards is transmitted as part of an elementary data stream associated with the program.

This method allows the generation of summaries almost simultaneously with the program itself, allowing a viewer to receive summaries only a few minutes subsequent to programming segments.

What we claim is:

1. A method of processing programming to facilitate selection and delivery of summaries of the programming to recipients of the programming, comprising the steps of:

providing the programming to the recipient via a program channel;

applying index markers to the programming to divide the programming into segments;

generating summary segments of parts of the programming segments and having index markers corresponding to the index markers of the programming;

generating metadata files associated with a summary channel for delimiting beginning and end of segments in the summary and program channels and including indexing information for facilitating links between the programming segments and the summary segments;

selecting a summary segment by activating a link between the programming segment and the summary segment by utilizing a metadata file included with the summary channel; and transmitting a selected summary segment and associated metadata to the recipient via summary channel.

2. The method of claim 1 comprising a step of:
   including the metadata file within a data stream included in a program stream according to MPEG-2 standards.

3. The method of claim 1 comprising a step of:
   including user data with each group of pictures corresponding to program segments.

4. The method of claim 1 comprising a step of:
   activating a link connection by a single physical command.

5. The method of claim 1 comprising a step of:
   including in the step of generating summary segments a step of dynamically generating summaries of live programming in real-time by dynamic editing software.

6. The method of claim 1 comprising a step of:
   constructing the metadata file in XML language to define the message.

7. The method of claim 1 whereby the step of:
   selecting by activating a link utilizes a one-way link.

8. The method of claim 1, whereby the step of:
   selecting by activating a link utilizes a two-way link.

9. A method of providing summaries of audio/video programming to a recipient, comprising:

providing from a program source a streaming programming signal;

dividing programs into program segments each identified by index marks;

summarizing each program segment into corresponding summary segments identified by similar index marks;

storing the summary segments in a storage medium;

accessing via a two-way video hyperlink the summary segments by linking a recipient to the storage medium, wherein the accessing via the two-way hyperlink further includes a viewer viewing a summary segment and selecting a link function during that summary segment whereby control passes to a beginning of a corresponding program segment;

supplying the summary segments in lieu of program segments on demand of the recipient; and passing control at a completion of the corresponding program segment to a beginning of a next summary segment.

10. A method of providing summaries of audio/video programming to a recipient, comprising:

providing from a program source a streaming programming signal;

dividing programs into program segments each identified by index marks;

summarizing each program segment into corresponding summary segments identified by similar index marks;

storing the summary segments in a storage medium;

accessing via a two-way video hyperlink the summary segments by linking a recipient to the storage medium, wherein the accessing via the two-way video hyperlink further includes a viewer viewing a program segment and selecting a link function during the program segment whereby control passes to a beginning of a corresponding summary segment;

supplying the summary segments in lieu of program segments on demand of the recipient; and passing control at a completion of the corresponding summary segment to a beginning of a next program segment.

* * * * *